June 7, 1966  P. G. HOFBAUER  3,254,372
APPARATUS FOR FABRICATING AND INSULATING LAMINATION ASSEMBLIES
OF A STATOR OR ROTOR UNIT FOR USE IN AN ELECTRICAL DEVICE
Filed June 19, 1962  5 Sheets-Sheet 1

LOAD DRY LAMINATIONS ON AN ARBOR

INVENTOR.
PETER G. HOFBAUER
BY
ATTORNEY

THE ARBOR IS SHAPED SO THAT IT WILL
CAUSE A THIN INSULATING FILM OF MOLDING
MATERIAL TO FLOW INTO THE WINDOW
OPENINGS OF THE LAMINATION STACK

INVENTOR.
PETER G. HOFBAUER
BY
ATTORNEY

INVENTOR.
PETER G. HOFBAUER

INVENTOR.
PETER G. HOFBAUER
BY Herbert L. Davis
ATTORNEY

United States Patent Office 3,254,372
Patented June 7, 1966

3,254,372
APPARATUS FOR FABRICATING AND INSULATING LAMINATION ASSEMBLIES OF A STATOR OR ROTOR UNIT FOR USE IN AN ELECTRICAL DEVICE
Peter G. Hofbauer, Clifton, N.J., assignor to The Bendix Corporation, Teterboro, N.J., a corporation of Delaware
Filed June 19, 1962, Ser. No. 203,642
4 Claims. (Cl. 18—36)

This invention relates to a novel apparatus for fabricating and insulating lamination assemblies of a stator or rotor unit for use in an electrical device. More particularly, the invention relates to a novel apparatus for electrically insulating the slots of windows and the ends of the lamination assembly of stator or rotor units of motors, synchros, generators, or the like so as to prepare for the winding of field coils in the slots of such units by apparatus and methods disclosed and claimed in copending U.S. application Serial No. 746,437, filed July 3, 1958, now Patent No. 3,061,211 by George I. Roberts, and in U.S. application Serial No. 37,142 filed June 20, 1960, now Patent No. 3,061,212, by George I. Roberts, both of which were assigned to The Bendix Corporation, assignee of the present application.

Heretofore, under the prior art processes, such lamination assemblies were cemented and placed on an arbor and were thereafter clamped in place between suitable plates and the arbor removed with the assembly thereafter placed in an oven to cure the cement. The plates were then removed leaving the completed lamination assembly. However, this previous process necessitated paper insulators being cemented in place by hand on the ends of the lamination assembly. Moreover, under the prior practice, individual slots in such stator or rotor units were insulated by the hand insertion of individual strips of insulation tape in each slot. In the insertion of the individual strips of insulation tape in the several slots of the unit, it has been found that considerable time was taken inasmuch as individual strips of insulation tape tend to move around and the operator had to spend considerable time in keeping the strips of tape in correct position in the slots of the unit.

It was thereafter found that a continuous strip of insulation tape remained relatively secure in the several slots of the unit so that the insertion of coils of wire in the several slots of the unit could be done without a loss of time on the part of the operator in the repositioning of the inserted insulation tape. There was then developed a complex apparatus for the insertion of insulation tape in the slots of such units and this apparatus and method of inserting tape formed the subject matter of copending U.S. application Serial No. 179,336, filed March 13, 1962, by George I. Roberts, and assigned to The Bendix Corporation, assignee of the present application.

The apparatus forming the subject matter of the present application simplifies the process of assembling the aforenoted lamination assemblies as well as providing for the insulation of the stator slots as well as the windows or ends of the assembly so that the insertion of the coils of wire in the several slots of the unit may be effected by hand or automatic insertion of the strips of insulation tape by the mechanism heretofore described in the aforenoted U.S. application Serial No. 179,336.

An object of the invention, therefore, is to provide a novel apparatus for the manufacture of the lamination assembly in which the laminations may be placed on an arbor and this assembly placed in a mold and in which during the molding cycle the laminations are bonded together and the molding compound provides a window insulation as well as insulate surfaces of the end plates of the lamination assembly so that upon removal of the arbor, the unit may be subject to the winding process and the winding of coils therein by apparatus such as disclosed and claimed in the aforenoted copending U.S. application Serial No. 746,437 and U.S. application Serial No. 37,142.

Another object of the invention is to provide a simplified appratus to increase the quality of the lamination assembly as well as make the lamination assembly of such units stronger and more uniform, because of positive locations of lamination slots and windows so arranged as to be completely insulated and in which the steps of applying end paper insulators as well as the insertion of the insulation tape in the slots of the unit may be completely eliminated.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 13:
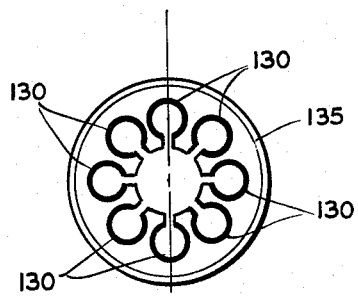
Figure 14:
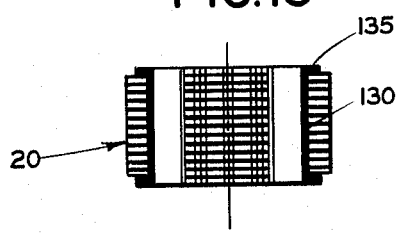

FIGURES 7, 8, 9, 10, 11, 12, 13 and 14 illustrate a comparative showing of the step-by-step build-up of a typical lamination assembly under a prior art process, shown by FIGURES 7–8, 9–10 and 11–12, as compared to the process of the present invention and in which FIGURES 13 and 14 respectively, illustrate the lamination assemblies resulting from the lamination assembly of the process of the present invention in which during the molding cycle the laminations are bonded together by the molding compound which also provides a thin layer of insulation at each end of the lamination assembly as well as a thin layer of insulation on the inner surface of the so-called windows of the lamination assembly.

Figure 1:
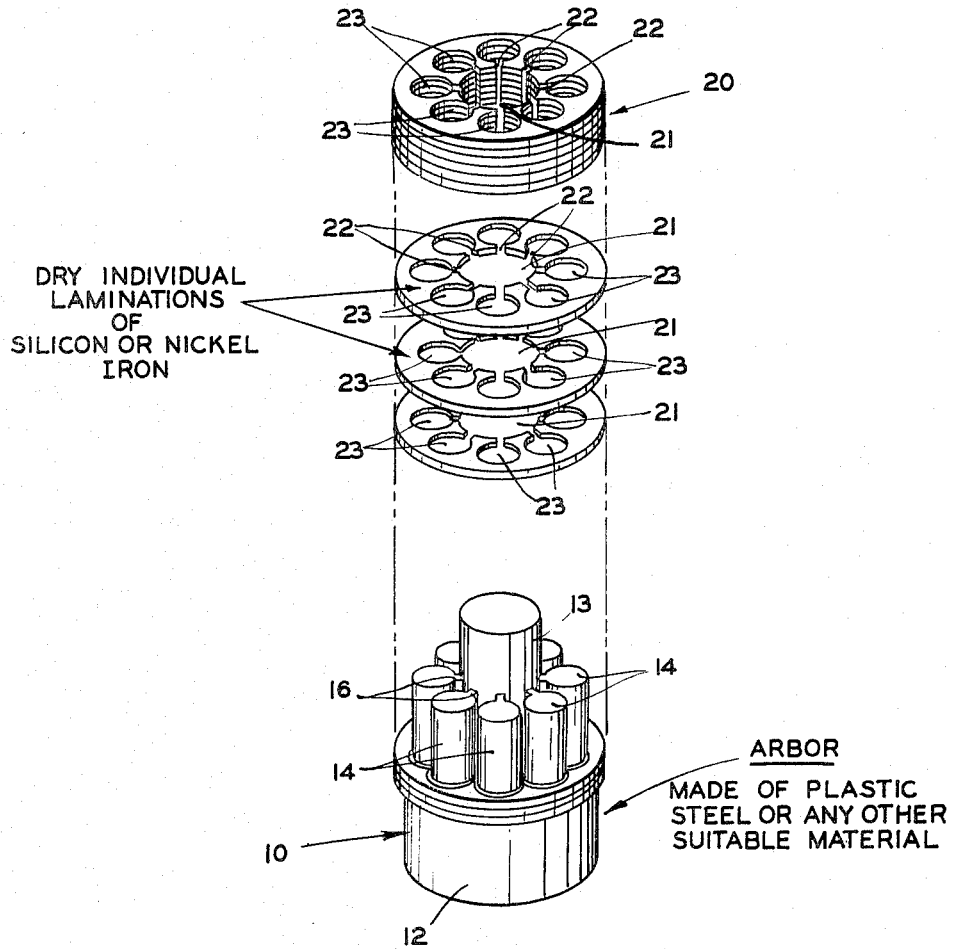
FIGURE 1 is an exploded prespective view illustrating a step of the process of the invention in the assembly of dry individual laminations on an arbor.
Figure 3:
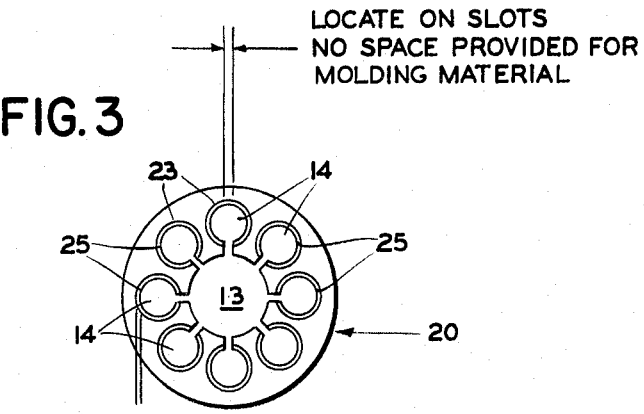
FIGURE 3 is a top end view of the lamination assembly effected by the arbor of FIGURE 2.

Referring to the drawing of FIGURE 1, there is indicated by the numeral 10, an arbor which may be made of a suitable plastic, steel, etc., or other suitable material embodying a base portion 12. A shaft 13 extends axially from the base portion 12 and there is arranged about the shaft 13 in equal spaced relation a plurality of pins 14 projecting from the base portion 12. Web portions 16 extend from the base portion 12 and radially from shaft 13 in connecting relation between the shaft 13 and pins 14. As illustrated schematically in FIGURE 1, an electro-magnetic assembly may include individual metal laminations 20 each having annular openings 21 including slots 22 radiating therefrom and opening into so-called windows 23. The shaft 13 is arranged so as to slidably fit in the annular opening 21 while the web portions 16 tightly fit in corresponding slots 22 of the laminations 20 so as to center the windows 23 of the laminations 20 in spaced relation to corresponding pins 14 which are arranged to project therethrough.

Figure 2:
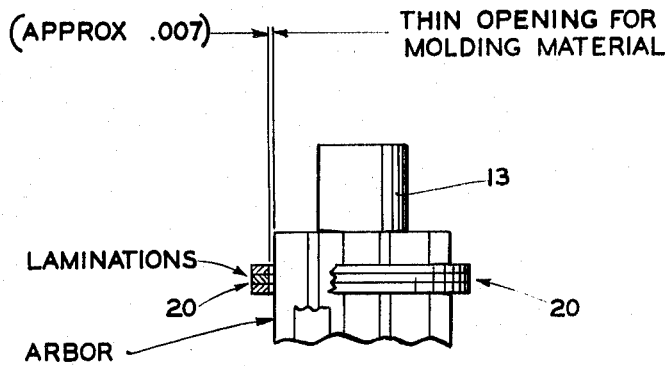
FIGURE 2 is a schematic view illustrating the arbor of FIGURE 1 and the arrangement thereof in relation to the lamination assembly so as to cause a thin film of molding material to flow into the window openings of the lamination stacks to electrically insulate the inner surface thereof.
Figure 5:
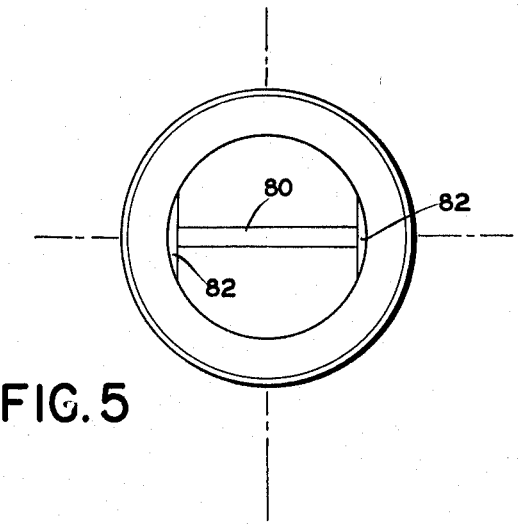
FIGURE 5 is a top plan view of the arbor and mold of FIGURE 4.

In such assembly, dry laminations are mounted by the operator on the arbor 10 and so arranged that the web portions 16 slidably fit, as shown schematically in FIGURE 1, in corresponding slots 22 of the lamination assembly 20. As best shown in FIGURE 2, the pins 14 are arranged in spaced relation to the inner surfaces of windows 23 so that a thin window insulation of six thousandths (.006) to eight thousandths (.008) of an inch is applied in such space indicated by numeral 25 upon the molding material, as hereinafter explained, being applied thereto. It will be seen then that the shape of the arbor 10 is such as to provide not only slot location by the arrangement of the web portions 16 but also the arbor 10 serves to direct the molding material so as to effect a thin layer of insulation material on the inner surface of the windows 23.

Figure 4:
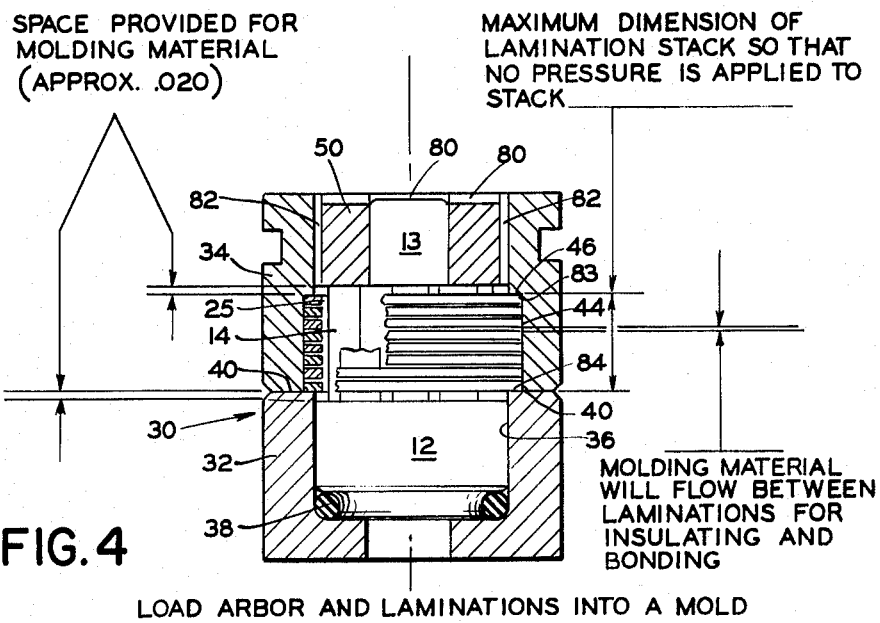
FIGURE 4 is a schematic sectional view illustrating another step in the process of the invention in which the arbor and assembled lamination are loaded into a mold.

After the laminations 20 are loaded on the arbor 10, as heretofore explained, the arbor 10 and lamination assembly 20 are loaded by the operator into a mold 30, shown schematically in FIGURE 4 and including the separable parts 32 and 34. The part 32 includes a chamber 36 having positioned at the bottom thereof an O-ring 38 on which the base portion 12 of the arbor 10 rests. The base portion 12 of the arbor 10 slidably fits in the chamber 36 and is arranged in spaced relation to an upper edge 40 of part 32.

Further, as shown in FIGURE 4, a lower end plate 84 of the lamination assembly 20 rests upon the upper edge 40 of the part 32 so as to provide a space 42 between the base 12 and the lower end plate 84 of the assembly 20. The lamination assembly 20, as shown in FIGURE 4, is received in a chamber 44 provided in the upper part 34 of the mold 30 and an upper end plate of the lamination assembly 20 is limited by an edge 46 of the chamber 44.

Figure 6:
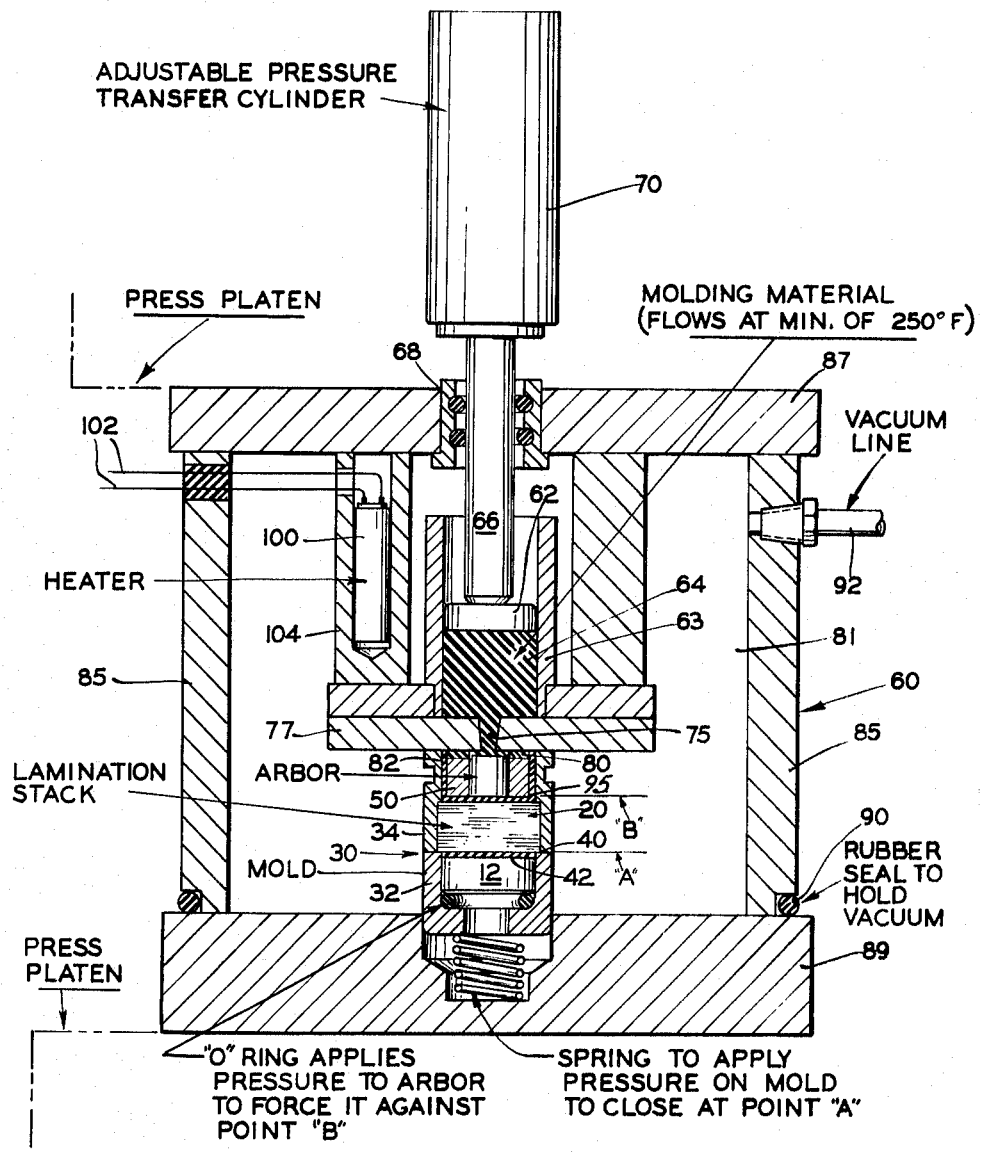
FIGURE 6 is a schematic sectional view illustrating another step of the process of the invention in which the mold, arbor and assembled laminations are shown in assembled relation in a molding press in which the molding compound is forced into the lamination assembly under low pressure.

Further, mounted on the shaft 13 and bearing on the upper ends of pins 14 is a member 50 positioned thereby in spaced relation to the inner surface of the upper part 34 and plate 77, as shown in FIGURES 4 and 6, so as to provide a channel 80 between member 50 and plate 77 and a channel 82 between the member 50 and the inner surface of the upper part 34 of the mold 30.

Moreover, after the laminations 20 have been placed on the arbor 10 and loaded in the mold 30, as shown in FIGURE 4, this assembly is then transferred into a molding machine 60, as shown in FIGURE 6. In the latter arrangement of FIGURE 6, there is provided a piston 62 slidably mounted in a cylinder 63 having a supply of a suitable molding material 64 upon which bears the piston 62. The piston 62 includes a piston rod 66 slidably mounted in suitable O-rings 68 and operated in conventional manner by an adjustable pressure transfer mechanism 70 to apply the molding material to the lamination assembly in the molding machine 60, as hereinafter explained.

The molding material used in the process of the invention is a suitable thermosetting material such as a ceramic filled epoxy resin of a type having excellent dielectric strength, heat resistance and bond qualities. This thermosetting material may be of a type sold by the Mitchell Rand Company under the designation "007 Pill 3½ (Blue)" or a type sold by Hi-Temp Resins, Inc. under the designation "#5449 Pill 3½ (Red)" and including an appropriate combination of epoxy resin, hardening agents, fillers, coloring agents, etc, such as will process to produce the final cured molded product, as described herein having excellent dielectric strength, heat resistance and bonding qualities.

The molding material 64 provided in the cylinder 63 is forced under the pressure of the piston 62, controlled by the operator, through an opening 75 in a plate 77 into the space 80 defined by the member 50 and plate 77, as shown in FIGURES 4 and 6. Moreover, the channel 82 defined by the member 50 and the inner surface of the upper part 34 leads from space 80 into a second space 95 between the member 50 and an upper plate 83 of the lamination assembly 20. The member 50 rests on the upper end of the pins 14 so as to provide the space 95 between the upper plate 83 of the lamination assembly 20 and the lower edge of the member 50.

The molding material is applied through the space 95 about the pins 14 and through the spaces 25 provided between the pins 14 and the inner surfaces of the windows 23 of the lamination assembly 20, best shown in FIGURES 2 and 4, and into the space 42, as shown in FIGURE 6.

As shown in FIGURE 6, the mold 30, arbor 10, and lamination assembly 20 are positioned in the molding press 60 including a chamber 81 defined by wall members 85, upper plate 87 and lower plate 89 having a suitable seal 90. Opening into the chamber 81 is a vacuum line 92 which may be connected to a suitable suction pump or other source of suction.

Further, provided in the chamber defined by the walls 85 is a suitable electrical heater 100 energized through electrical lines 102 and positioned in fixed relation to the cylinder 63 by walls 104 connected between the top plate 87 and the plate 77.

The heater unit 100 maintains the molding material sufficiently fluid so that under pressure of the piston 62, controlled by the operator, the material is forced about the inner surfaces of the windows 23 of the lamination assembly 20 so as to provide a thin insulation layer 130 of between six thousandths (.006) and eight thousandths (.008) of an inch as well as a thin layer 135 of insulation material on the end plates of the lamination assembly, as best shown by FIGURES 13 and 14.

It will be further seen that the mold 30 is so formed that substantially no pressure is exerted on the lamination stack 20 as such. This permits a small amount of the molding material to be applied between the laminations 20 so as to insulate them from each other and also to bond them together upon completion of the curing process of the molded material.

In order to effect the foregoing process, the heater 100 maintains the parts of the assembly 60 and molding material 64 at the desired temperatures of, for example, three hundred degrees Fahrenheit (300° F.) plus or minus ten degrees (10°).

Further, the pressure of the ram 62 is approximately 40 p.s.i. and the vacuum maintained through a conduit 92 in the chamber 81 is approximately 29 inches Hg.

After removing the parts from the press, all flash shall be removed and after cleaning, the parts are mounted on a rod and horizontally suspended in a curing oven, at a temperature of two hundred and seventy-five degrees Fahrenheit (275° F.) for a period of not less than two hours.

The resulting lamination assembly 20 is shown in cross section in FIGURE 14 with the ends having the layer 135 and the inner surfaces of window openings 23 having the thin layer 130 of insulation material.

Figure 7:
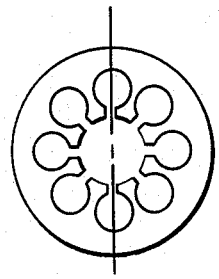
Figure 9:
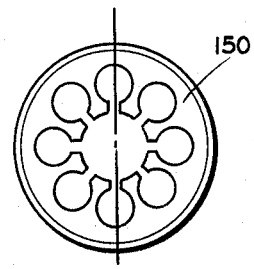
Figure 11:
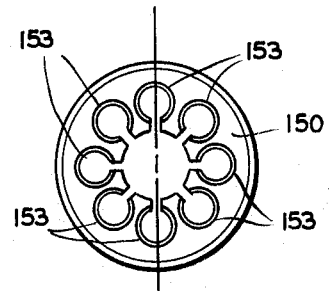
Figure 8:
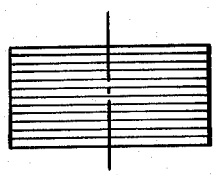
Figure 10:
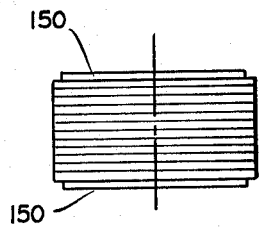
Figure 12:
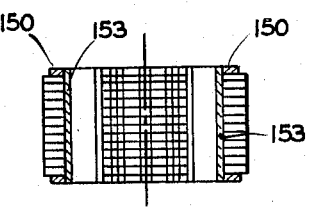

As distinguished from the improved lamination assembly of FIGURE 14, in the prior art arrangement the lamination assembly 20 is cemented together, as shown in FIGURES 7 and 8, and then paper insulators 150 are cemented by hand, as shown in FIGURES 9 and 10 while thereafter and prior to inserting the windings in the windows, as set forth in copending application Serial Nos. 746,437 and 37,142 paper insulators 153 may be either inserted by hand or by the apparatus and method described in the copending U.S. application Serial No. 179,336.

In distinction, in the present invention, the operations of applying paper insulators to the lamination assembly may be effectively eliminated by the use of the ceramic filled epoxy resin insulation material, as herein described for both insulating lamination assembly, as well as bonding the assembly together.

Advantages of the present invention over that of the prior arrangement include the following:

(1) Positive thickness of insulation in the window openings and on the ends of the stack.
(2) Positive control of the overall height of the stack.
(3) In subsequent operations, less time is required to insert the coils in the windows because there is no insulation to constrict the small slot openings.
(4) The cost of the stack is 20% lower than by the prior methods.
(5) Better bonding of the laminations.
(6) Positive location of the slot openings.
(7) Elimination of the aforementioned hand assembled paper end insulation.
(8) Elimination of the aforementioned hand or machine assembled paper window insulation.
(9) The heat resistance of the lamination assembly is improved under the present invention.
(10) Less chance of spring back of the windings in subsequent coil forming operations.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An arbor for the assembly of a laminated core of an electrical device, said core being of a type including a plurality of lamina, each of the lamina having a solid annular outer periphery and an annular opening defined by an inner periphery having slots opening into window openings provided in the lamina, the arbor comprising a shaft, a plurality of pins positioned about the shaft in equal spaced relation, the shaft having a relatively greater length than said pins, and web portions extending radially from said pins to the shaft, the annular opening being arranged to slidably receive said shaft upon a first stage axial assembly of the lamina on the shaft with each of the web portions being arranged to slidably fit in one of said slots corresponding thereto upon a succeeding angular and axial stage of assembly of the lamina on the shaft so as to position the slots thereof into coincidence with the radially extending web portions, the window openings of the lamina being sufficiently larger than the pins and so related to the slots opening into the window openings in which the web portions are slidably fitted that each of the pins of the arbor are effectively maintained thereby in a spaced relation to the inner surfaces of one of said window openings corresponding thereto so as to permit films of a dielectric molding material to flow into the window openings for deposit on the inner surfaces thereof.

2. An arbor for the assembly of a laminated core of an electrical device, said core being of a type including a plurality of plates, each of the plates having an annular opening and slots leading therefrom into window openings; said arbor comprising a base portion, a shaft extending axially from the base portion, and there being arranged about the shaft in equal spaced relation a plurality of pins projecting from the base portion in parallel relation to the shaft, the shaft being of a greater axial length than said pins, and web portions extending radially from said pins to the shaft in connecting relation between the shaft and the pins, and an annular opening in the plates being so arranged as to slidably receive the shaft upon a first stage axial assembly of the plates on the shaft with the web portions being arranged to slidably fit in said slots corresponding thereto upon a second stage angular and axial assembly of the plates on the shaft so as to position the slots thereof into coincidence with the web portions, the window openings of the plates being sufficiently larger than the pins and so arranged in relation to the slots opening into the window openings and the web portions slidably fitted in the slots as to effectively maintain each of the pins of the arbor in a spaced relation to inner surfaces of each one of said window openings corresponding thereto so as to permit deposit of a film of a dielectric molding material on the inner surfaces of the window openings.

3. Means for the assembly of a laminated core of an electrical device, said core being of a type including a plurality of plates, each of the plates having an annular opening and slots leading therefrom into window openings provided therein, said assembly means comprising an arbor including a base portion, a shaft extending axially from the base portion, and a plurality of pins arranged about the shaft in equal spaced relation, said pins projecting from the base portion, and web portions extending radially from the shaft in connecting relation between the shaft and the pins, the shaft being positioned in the annular opening in the plates with the web portions being arranged to slidably fit in the corresponding slots of said plates upon assembly thereon so as to effectively maintain each of the pins of the rotor in a spaced relation in one of said window openings corresponding thereto, a mold for receiving the arbor and assembled plates including means for forcing a dielectric molding material into the window openings of said plates and around said pins for deposit of a film of the material on the inner surfaces of said window openings.

4. Means for the assembly of a laminated core of an electrical device, said core being of a type including a plurality of plates, each of the plates having an annular opening and slots leading therefrom into window openings provided therein, said assembly means comprising an arbor including a base portion, a shaft extending axially from the base portion, and a plurality of pins arranged about the shaft in equal spaced relation, said pins projecting from the base portion, and web portions extending radially from the shaft in connecting relation between the shaft and the pins, the shaft being positioned in the annular opening in the plates with the web portions being arranged to slidably fit in the corresponding slots of said plates upon assembly thereon so as to effectively maintain each of the pins of the rotor in a spaced relation in one of said window openings corresponding thereto, a mold for receiving the arbor and assembled plates including means for forcing a dielectric molding material into the window openings of said plates and around said pins for deposit of a film of the material on the inner surfaces of said window openings, and other films of the dielectric material between each of the assembled plates and at opposite ends of the plates.

References Cited by the Examiner

UNITED STATES PATENTS

| | | | |
|---|---|---|---|
| 1,735,049 | 11/1929 | Lester | 22—203 |
| 1,934,903 | 11/1933 | Apple | 310—43 |
| 1,982,279 | 11/1934 | Apple | 264—272 XR |
| 2,563,468 | 8/1951 | Hroch | 29—203 XR |
| 2,769,933 | 11/1956 | Ballman | 310—217 |
| 2,783,404 | 2/1957 | Appenzeller | 310—217 |
| 2,835,026 | 5/1958 | Saari | 29—203 |
| 2,892,249 | 6/1959 | Feinberg et al. | 29—155.61 |
| 2,910,767 | 11/1959 | Log | 29—155.61 |
| 2,952,876 | 9/1960 | Miles. | |
| 3,023,493 | 3/1962 | Mittermaier | 20—203 |
| 3,045,133 | 7/1962 | Aske | 310—43 |

J. SPENCER OVERHOLSER, *Primary Examiner.*

MILTON HIRSHFIELD, *Examiner.*